(12) United States Patent
Fischer et al.

(10) Patent No.: US 9,409,121 B2
(45) Date of Patent: Aug. 9, 2016

(54) SOLVENT, PROCESS FOR PROVIDING AN ABSORPTION LIQUID, USE OF THE SOLVENT AND PROCESS FOR ACTIVATING THE SOLVENT

(75) Inventors: Björn Fischer, Frankfurt am Main (DE); Ralph Joh, Seligenstadt (DE); Ingo Schillgalies, Senden (DE); Rüdiger Schneider, Eppstein (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 159 days.

(21) Appl. No.: 13/980,914

(22) PCT Filed: Jan. 12, 2012

(86) PCT No.: PCT/EP2012/050414
§ 371 (c)(1),
(2), (4) Date: Jul. 22, 2013

(87) PCT Pub. No.: WO2012/104123
PCT Pub. Date: Aug. 9, 2012

(65) Prior Publication Data
US 2013/0292607 A1    Nov. 7, 2013

(30) Foreign Application Priority Data
Jan. 31, 2011 (EP) .................................. 11152703

(51) Int. Cl.
*B01D 53/14* (2006.01)
*B01D 53/62* (2006.01)

(52) U.S. Cl.
CPC ............ *B01D 53/62* (2013.01); *B01D 53/1475* (2013.01); *B01D 53/1493* (2013.01); *B01D 2252/20494* (2013.01); *B01D 2252/602* (2013.01); *Y02C 10/06* (2013.01)

(58) Field of Classification Search
CPC ....................... B01D 53/1475; B01D 53/1493
See application file for complete search history.

(56) References Cited

U.S. PATENT DOCUMENTS 2,176,441 A    10/1939  Baehr
3,761,287 A *   9/1973  Jaeggi ........................... 426/533

FOREIGN PATENT DOCUMENTS

| EP | 0544515 A1 | 6/1993 | |
| GB | 1129774 A * | 10/1968 | ....... A61B 17/06114 |
| WO | WO 2010053377 A1 | 5/2010 | |

\* cited by examiner

*Primary Examiner* — Peter F Godenschwager

(57) ABSTRACT

A solvent for selective absorption of $CO_2$ from the flue gas from a combustion plant is provided. The solvent includes an aqueous solution of a secondary amino acid salt as an active scrubbing substance and an additive, the additive including a primary amino acid salt. A process for providing an absorption liquid is also provided as well as a process for activating a solvent.

1 Claim, 3 Drawing Sheets

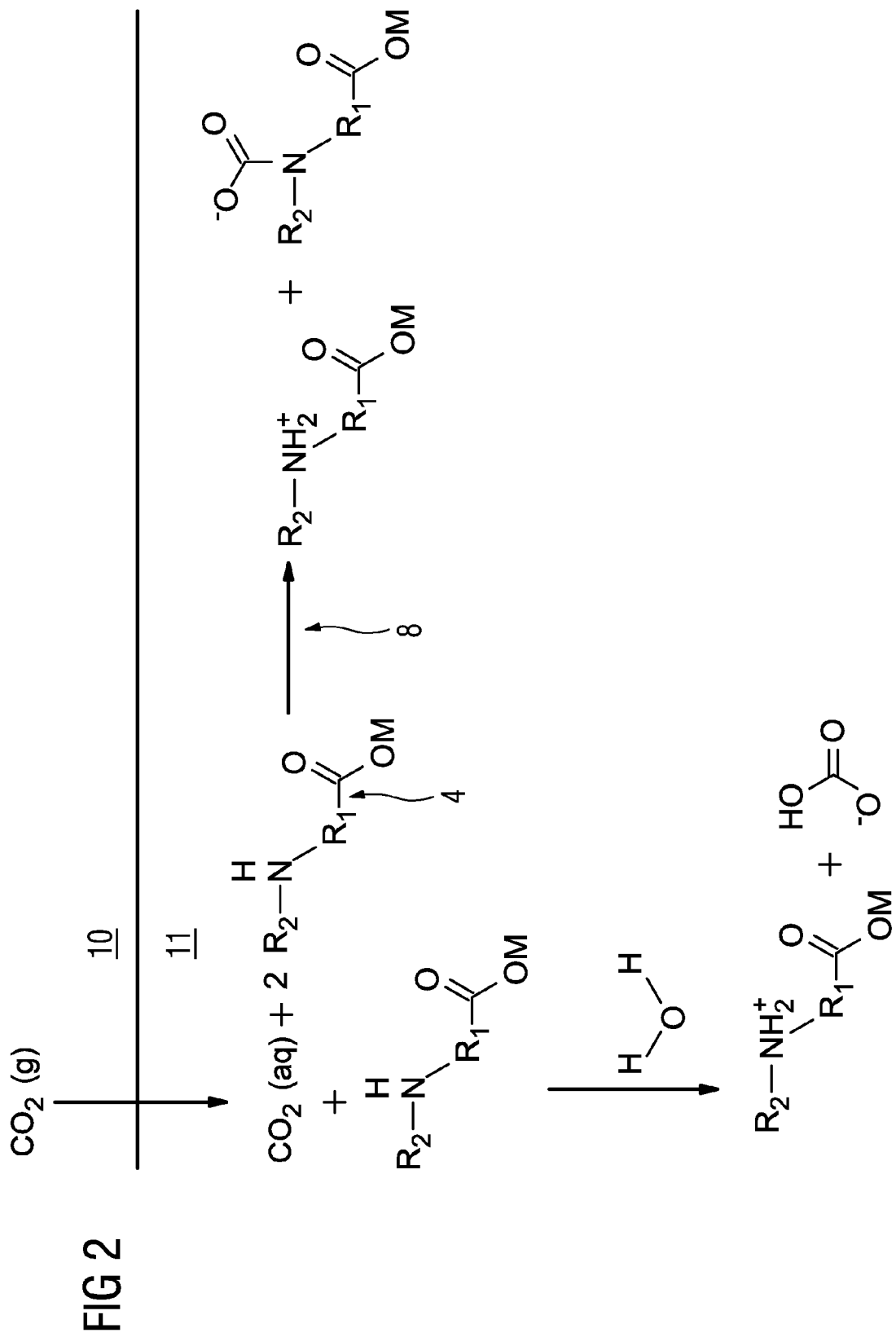

SOLVENT, PROCESS FOR PROVIDING AN ABSORPTION LIQUID, USE OF THE SOLVENT AND PROCESS FOR ACTIVATING THE SOLVENT

CROSS REFERENCE TO RELATED APPLICATIONS

This application is the US National Stage of International Application No. PCT/EP2012/050414 filed Jan. 12, 2012 and claims benefit thereof, the entire content of which is hereby incorporated herein by reference. The International Application claims priority to the European Patent Office application No. 11152703.2 EP filed Jan. 31, 2011, the entire contents of which is hereby incorporated herein by reference.

FIELD OF INVENTION

A solvent is provided. The solvent includes an aqueous solution of a secondary amino acid salt as an active scrubbing substance and an additive, the additive including a primary amino acid salt. A process for providing an absorption liquid and a process for activating a solvent are also provided.

BACKGROUND OF INVENTION

In fossil-fired power plants for generation of electrical power, the combustion of a fossil fuel gives rise to a carbon dioxide-containing flue gas. To avoid or to reduce carbon dioxide emissions, carbon dioxide has to be removed from the flue gases. In general, various methods are known for removal of carbon dioxide from a gas mixture. Especially for removal of carbon dioxide from a flue gas after a combustion operation, the method of absorption-desorption is commonly used. On the industrial scale, carbon dioxide ($CO_2$) is scrubbed out of the flue gas in an absorber with an absorption liquid ($CO_2$ capture operation).

Commonly used absorption liquids (solvents) are based on primary, secondary or tertiary amines and exhibit good selectivity and high capacity for carbon dioxide $CO_2$.

The advantage of secondary amine compounds (secondary amines or secondary amino acid salts) over primary amine compounds (primary amines or primary amino acid salts) lies in the much lower absorption energy and the resulting lower regeneration energy, which is perceptible in a smaller drop in efficiency of the power plant. Furthermore, secondary amine compounds exhibit a higher loading capacity for $CO_2$. One advantage of the primary amine compounds is the much faster absorption kinetics. This allows the columns of a $CO_2$ capture plant to be designed smaller compared to the secondary amines or secondary amino acid salts, which leads to lower capital costs.

The advantage of amino acid salts compared to heterocyclic amines or alkanolamines is that amino acid salts do not have any noticeable vapor pressure, and thus do not evaporate and cannot be discharged into the environment by the $CO_2$ capture operation. Heterocyclic amines and alkanolamines are volatile and are also discharged by the flue gas emitted into the environment, which leads to unwanted environmental pollution.

In the chemical industry, principally the primary amine MEA (monoethanolamine) is being used at the present time. Since the energy efficiency is not at the center of interest in the chemical industry, the energetic disadvantages have been very substantially neglected to date. In power plants, in contrast, it is precisely the energy consumption of the $CO_2$ capture operation which is of great significance, since it has a considerable influence on the overall efficiency of the power plant due to its size. This industrial conversion is currently the subject of research and development, which is why this problem is currently being optimized to a high degree.

SUMMARY OF INVENTION

It is an object of the invention to provide an environmentally compatible solvent for the absorption of $CO_2$, which has a high absorption capacity and at the same time a low energy consumption in the regeneration. A further object of the invention consists in specifying a process for providing an absorption liquid, by which the disadvantages from the prior art are avoided. It is a further object of the invention to specify a use of a solvent for selective absorption of $CO_2$ from the flue gas from a combustion plant, in which the disadvantages from the prior art are avoided. It is additionally an object of the invention to specify a process for activating an environmentally compatible solvent, such that the absorption rate is lowered and the energy consumption in the regeneration is reduced.

The problem addressed by the invention in relation to a solvent is solved by a solvent comprising an aqueous solution of a secondary amino acid salt and an activating additive, wherein the activating additive comprises a primary amino acid salt.

The invention exploits the fact that primary amine compounds react more rapidly with $CO_2$ to give a carbamate compound than secondary amine compounds. The invention is thus based on the particular finding that even small amounts of a primary amine compound are sufficient to considerably accelerate the absorption of $CO_2$. As a result of the use of amino acid salts, the solvent remains environmentally compatible, since there is no discharge of the amino acid salt into the atmosphere due to the undetectable vapor pressure. The invention thus makes it possible to combine the advantages of the secondary amino acid salt, namely the lower regeneration energy and the higher loading capacity, with those of the primary amino acid salt, namely the faster absorption kinetics.

Due to the fact that the amount of secondary amino acid salt in the solvent is still dominant, the regeneration energy is not increased. It can even be reduced further by the addition of the additive with the primary amino acid salt, since a correspondingly higher loading in the absorber is achieved and the driving force in the desorber increases due to the increased difference in partial pressure. Thus, savings arise both in the design of the absorber due to the increased absorption rate, and in the regeneration energy required.

An advantageous ratio between secondary amino acid salt and primary amino acid salt has been found to be between 80:20 (secondary amino acid salt/primary amino acid salt) and 99:1, and more advantageously between 90:10 and 95:5. The ratio is based on percentages by weight. The amount of primary amino acid salt should be kept to a minimum in order to minimize the adverse effects of the primary amino acid salt on the solvent. Consideration should be given to whether it is more favorable from an economic point of view to invest more energy into the desorption of the solvent at a higher proportion of primary amino acid salt, with the advantage of faster reaction rate, or to configure the $CO_2$ capture plant correspondingly larger with a lower proportion of primary amino acid salt.

The problem in respect of a process is solved by a process for providing an absorption liquid, in which an aqueous solution is made up with a secondary amino acid salt, and an additive is introduced into the aqueous solution, the additive comprising at least one primary amino acid salt.

The additive may include further constituents. It is also possible that various primary amino acid salts are present in a mixture.

An advantageous ratio between secondary amino acid salt and primary amino acid salt has been found to be between 80:20 and 99:1. The ratio is more advantageously between 90:10 and 95:5.

The problem addressed by the invention in respect of a use is solved by the use of a solvent for selective absorption of $CO_2$ from the flue gas from a combustion plant, wherein the solvent comprises an aqueous solution of a secondary amino acid salt and an activating additive, the additive comprising a primary amino acid salt. The combustion plant may be a fossil-fired steam power plant, a gas turbine plant, or a combined gas and steam turbine plant.

The problem addressed by the invention in respect of a process for activating a solvent is solved by a process for activating a solvent for selective absorption of $CO_2$ from the flue gas from a combustion plant, in which the solvent comprises an aqueous solution of a secondary amino acid salt, and in which the solvent is activated by addition of an activating additive (6), the additive comprising a primary amino acid salt. The ratio between secondary amino acid salt and primary amino acid salt is advantageously between 80:20 and 99:1. The process for activation can advantageously be employed in a $CO_2$ capture operation, in which $CO_2$ is absorbed from the flue gas from a fossil-fired steam power plant, from the offgas from a gas turbine plant, or from the offgas from a combined gas and steam turbine plant.

BRIEF DESCRIPTION OF THE DRAWINGS

Working examples of the invention are explained in detail hereinafter with reference to figures. The figures show:

FIG. 2 a reaction equation showing the slow reaction of $CO_2$ with a secondary amino acid FIG. 3 a reaction equation showing the rapid reaction of $CO_2$ with a primary amino acid FIG. 4 an example of a secondary amine

DETAILED DESCRIPTION OF INVENTION

Figure 1:
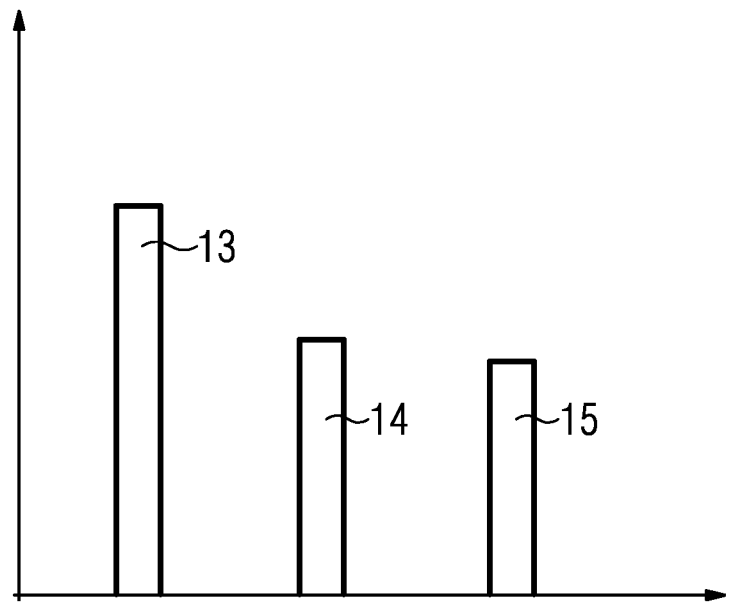
FIG. 1 a diagram showing the comparison of different solvents

The diagram shown in FIG. 1 shows the specific energy required for the removal of $CO_2$ from a flue gas in kJ per kg of $CO_2$ removed. There is no scale on the axis because the energy required is essentially also dependent on other process parameters, such as pressure, temperature, pumped circulation, flue gas mass flow rate, etc.

The bars represent different solvents 13, 14 and 15. The left-hand bar shows a solvent 13 with exclusively a secondary amino acid salt as an active scrubbing substance. The middle bar shows a solvent 14 comprising a secondary amino acid salt and a primary amino acid salt as an activating additive, and the right-hand bar shows, in comparison, a solvent 15 with a secondary amino acid salt and monoethanolamine. The ratio for solvents 14 and 15 between secondary amino acid salt and amine compound in this example is 95:5 (percent by weight). What is shown is the specific energy required for removal of $CO_2$ from a flue gas. It is assumed here that there is no change in any other process parameter other than the solvent used.

It is evident that the solvent 14 compared to solvent 13 requires much less specific energy. This means that, with the same column size, the solvent 14 activated with a primary amino acid salt exhibits a much smaller requirement for specific energy.

FIG. 2 shows a reaction equation showing the slow reaction 8 of $CO_2$ with a secondary amino acid. What is shown is the transition of the $CO_2$ from the gas phase 10 to the liquid phase 11. The absorption of $CO_2$, or the transition of the $CO_2$, from the gas phase 10 into the liquid phase 11 has a rate-determining effect on the actual $CO_2$ capture operation, since bicarbonate formation is much slower than carbamate formation, the latter being very low due to the steric hindrance of the secondary amino acid salt.

Figure 3:
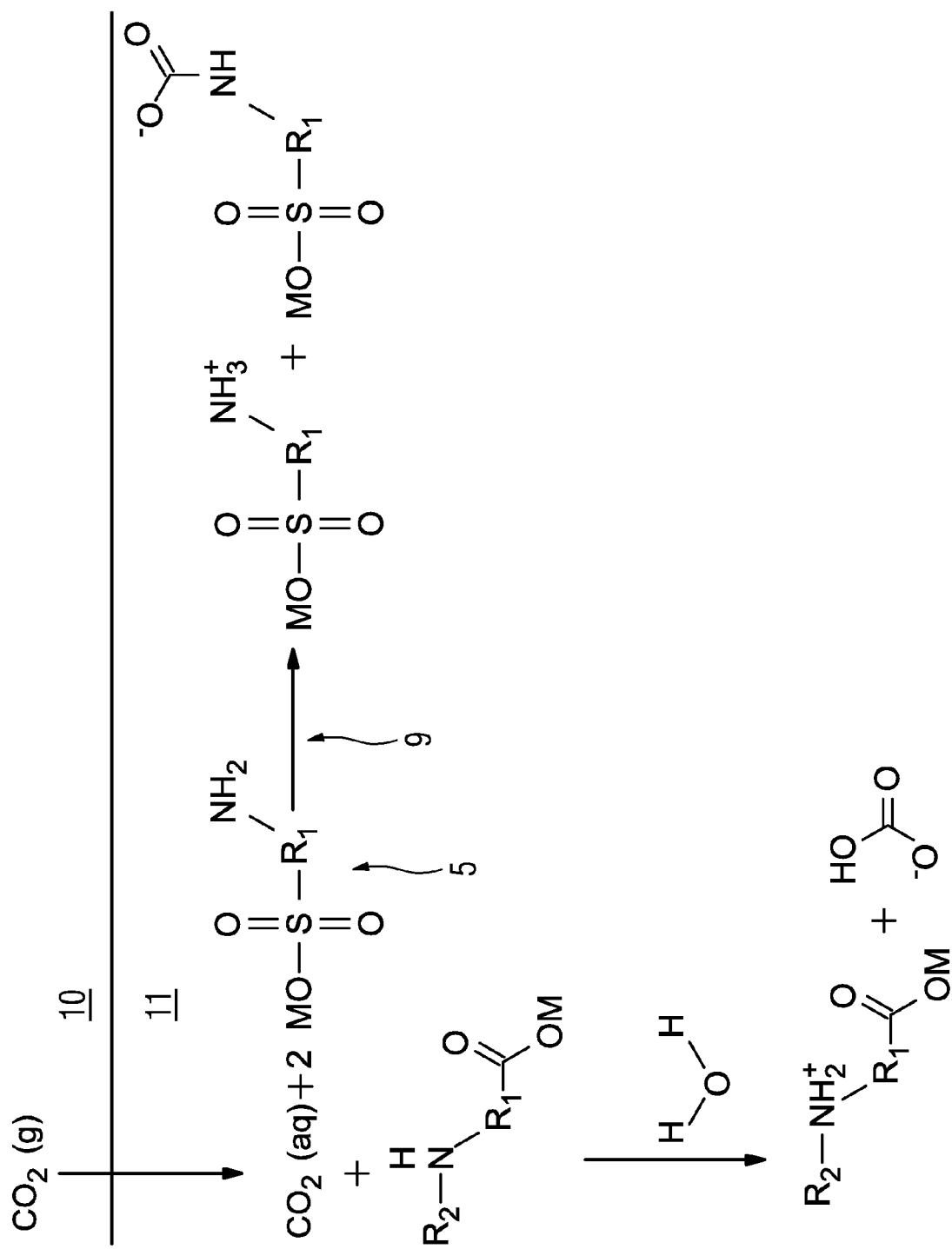

Compared to FIG. 2, FIG. 3 shows a reaction equation showing the rapid reaction 9 of $CO_2$ with a primary amino acid. The accelerated carbamate formation of the $CO_2$ as a result of the primary amino acid salt added shifts the equilibrium. As a result, the $CO_2$ passes more rapidly from the gas phase 10 into the liquid phase 11 of the solvent and can then form bicarbonate with the secondary amino acid salt.

In relation to the invention, merely a small addition of an activating additive with a primary amino acid salt (activator) is needed to already achieve a considerable acceleration of the $CO_2$ capture operation. An advantageous proportion has been found to be less than 20% by weight, based on the total amount of active amino acid salt. A higher addition of activator would worsen the absorption capacity, since the secondary amino acid salt can absorb 2 mol of $CO_2$ per mole of solvent as a result of the formation of the bicarbonate. The primary amino acid salt, in contrast, can absorb only 1 mol of $CO_2$ per mole of solvent.

Figure 4:
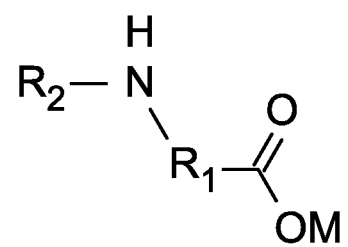

FIG. 4 shows an example of a secondary amine (amino acid salt) where R1 and R2 are each alkyl, hydroxyalkyl or haloalkyl, and M is Na, K, Li, Mg, Ca or Be.

The invention claimed is:
1. A solvent comprising:
an aqueous solution of a secondary amino acid salt; and
an activating additive,
wherein the activating additive comprises a primary amino acid salt,
wherein the ratio between secondary amino acid salt and primary amino acid salt is between 95:5 and 99:1.

* * * * *